(12) United States Patent
Saito et al.

(10) Patent No.: US 6,855,360 B2
(45) Date of Patent: Feb. 15, 2005

(54) SWEETNESS IMPROVING AGENT AND FOODS CONTAINING THE SAME

(75) Inventors: Susumu Saito, Saiki (JP); Hiroko Araki, Saiki (JP); Nobuhiro Uchimura, Saiki (JP); Osamu Shinhashi, Nagareyama (JP); Yuuki Kubota, Tokyo (JP); Yoshiki Aoyagi, Mitaka (JP)

(73) Assignee: Kohjin Co., Ltd., Tokyo (JP)

( * ) Notice: Subject to any disclaimer, the term of this patent is extended or adjusted under 35 U.S.C. 154(b) by 0 days.

(21) Appl. No.: 10/298,922

(22) Filed: Nov. 19, 2002

(65) Prior Publication Data

US 2003/0152684 A1 Aug. 14, 2003

Related U.S. Application Data

(63) Continuation of application No. 09/700,041, filed as application No. PCT/JP99/02561 on May 18, 1999, now abandoned.

(30) Foreign Application Priority Data

May 18, 1998 (JP) ............................................ 10-135356
Nov. 30, 1998 (JP) ............................................ 10-338343

(51) Int. Cl.$^7$ ............................................... A23L 1/22
(52) U.S. Cl. ....................... 426/534; 426/533; 426/548; 426/650; 426/656

(58) Field of Search ........................ 426/62, 533, 534, 426/548, 650, 656, 658

(56) References Cited

PUBLICATIONS

Nagodawithana, T., AN 304908 FROSTI, abstracting Food Technology, 1992, 46(11), 138–44.*
Anon, AN 328664 FROSTI, abstracting Prepared Foods, 1993, 162(6), 58–59.*
Parkin, A.R., AN 72(06):SO787 FSTA, abstracting Institute of Meat Bulletin, 1972, 75:25–27.*
Hegenbart, S., AN 298687 FROSTI, abstracting Food Product Design, 1992, 1(11), 56–70.*

* cited by examiner

*Primary Examiner*—Leslie Wong
(74) *Attorney, Agent, or Firm*—Gary M. Nath; Sheldon M. McGee; Jerald L. Meyer

(57) ABSTRACT

Sweetness improving agents capable of improving sweetness characteristics, in particular, aftertaste characteristics. More particularly, the sweetness improving agents contain as the active ingredient a yeast extract, in particular, one containing sodium 5'-inosinate and/or sodium 5'-adenylate, sodium 5'-guanylate; sodium 5'-uridylate and sodium 5'-cytidylate, each in an amount of 1 to 15% based on the weight of the yeast extract, and 1 to 20% of sodium glutamate.

2 Claims, No Drawings

SWEETNESS IMPROVING AGENT AND FOODS CONTAINING THE SAME

This is a Continuation patent application of U.S. patent application Ser. No. 09/700,041 filed Nov. 9, 2000, now abandoned, which is a 35 U.S.C. 371 of international application no. PCT/JP99/02561 with an international filing date of May 18, 1999.

BACKGROUND OF THE INVENTION

1. Field of the Invention

The present invention relates to a sweetness improving agent which improves sweetness properties, particularly aftertaste properties, and foods containing the same.

2. Description of Related Art

Recently, in the field of sweeteners, low caloric or non-caloric sweeteners have made a rapid spread in place of sucrose, which is high calorific, thanks to a health oriented mind. For example, aspartame, one of low calorific sweeteners is characterized by having no bitter taste nor astringent taste or stimulating taste but having refreshing sweetness. However, it is defective in that it lacks sufficient thickness as a sweetening substance and it retains sweetness in its aftertaste. Other low calorific and non-calorific sweeteners also have defects in that they have insufficient sweetness, generation of foreign sweetness, or dull sweetness. Food containing the low calorific or non-calorific sweeteners has been increasingly felt to have similar defects such as insufficient sweetness, generation of foreign sweetness, or dull sweetness.

Regarding improvement of the sweetness properties of sweeteners, there have hitherto been made various proposals. For example, there have been reported the method in which a sugar derivative is used in combination (Japanese Patent Application Laid-open No. Sho 60-149358, Japanese Patent Application Laid-open No. Sho 63-12263, and Japanese Patent Application Laid-open No. Hei 1-300871), the method in which sodium chloride is added (Japanese Patent Application Laid-open No. Sho 61-212257 and Japanese Patent Application Laid-open No. Hei 4-237473), the method in which pepper extract is added (Japanese Patent Application Laid-open No. Sho 64-63356), the method in which honey flavor or coconut flavor is added (Japanese Patent Application Laid-open No. Hei 4-222575), the method in which a hesperidin derivative is added (Japanese Patent Application Laid-open No. Hei 8-256725), etc. and the sweetness properties of food have been improved in a similar manner.

However, the improvement in sweetness properties of low caloric or non-caloric sweeteners to provide satisfaction which equal to that of sucrose still remains insufficient and in many cases ingredients which are used in combination or added have the problem that they require the same degree of mass as those of the sweeteners. Further, the taste (sweetness) which remains as an aftertaste tends to give adverse influences on the total taste of the food so that improvement in swift vanishing of an aftertaste has been desired.

SUMMARY OF THE INVENTION

As a result of intensive investigation by the present inventors with view to solving the problems, it has now been found that a yeast extract, particularly a yeast extract containing sodium 5'-inosinate and/or sodium 5'-adenylate; and sodium 5'-guanylate, sodium 5'-uridylate, and sodium 5'-cytidylate, each in an amount of 1 to 15% based on the weight of the yeast extract, and 1 to 20% of sodium glutamate based on the weight of the yeast extract, improves sweetness properties, particularly after taste properties. The present invention has been completed based on this discovery. Accordingly, the present invention provides a sweetness improving agent comprising a yeast extract as an effective ingredient and a food containing such an sweetness improving agent.

Hereinafter, the present invention will be described in greater detail.

In the present invention, the yeast for use in the yeast extract includes yeasts used as food or as an food additive, for example, baker's yeasts, brewer's yeasts, Torula yeasts, etc.

The yeast extract, which is an effective ingredient used in the present invention is a yeast extract obtained by, for example, 1) a method in which a yeast is extracted with warm or hot water of pH 5 to 12, 2) a method in which a yeast is extracted by addition of a proteolytic enzyme, a cell wall degrading enzyme, etc., 3) a method in which a yeast is extracted with an enzyme in the yeast by autolysis, 4) a method in which two or more of the above-described methods are used in combination, or 5) a method in which a nuclease, an AMP deaminase, etc. are acted on the resultant yeast extract.

Among the yeast extracts, the yeast extract which is obtained by extracting a yeast with warm or hot water and subsequently acting a nuclease, an AMP deaminase and contains 1 to 15% each of sodium 5'-inosinate, sodium 5'-guanylate, sodium 5'-uridylate and sodium 5'-cytidylate, and 1 to 20% of sodium glutamate, based on the weight of the yeast extract, is particularly preferred and exhibits great effect of improvement in sweetness properties such as sweetness enhancement and sharpness of sweetness.

The sweetness improving agent of the present invention is added to a sweetener in an amount of 0.0001 to 10 wt %, preferably 0.001 to 10 wt %, and more preferably 0.001 to 1 wt %, based on the sweetener. The amount of sweetness improving agent to be added to foods is fundamentally based on the sweetness of the food in a state where no sweetness improving agent is contained and varies from food to food depending on the degree and quality of sweetness required for the respective foods. However, generally a value of 0.0001 to 10 wt % is selected based on the targeted food.

The sweetener includes natural sugar sweeteners such as sugar glucose and sucrose, fructose, maltose, xylose, lactose, sorbose, honey, and maple sugar, sugar alcohols such as sorbit, sorbitol, mannit, mannitol, maltit, maltitol, xylit, xylitol, and ligacin, and other sweeteners such as saccharine, aspartame, glycyrrhizin, stevioside, and thaumatin.

The foods containing the sweetener of the present invention include various foods such as Japanese unbaked cakes [bean jam, kintsuba (jelly cake with bean jam inside), manju (steamed bean jam bun), daifukumochi (rice cake with bean jam inside), kibidango (millet dumpling), ohagi (rice ball covered with bean jam), kashiwamochi (rice cake with bean jam inside wrapped with oak leaf), sakuramochi (rice cake wrapped with a cherry blossom leaf), monaka (bean jam in baked rice wrapping), yokan (bean jam contained jelly cake), uiro (glutinous rice jelly), etc], confectionarys with sugar/syrup [anmitsu (bean jam and honey), mitsumame (bean with honey), warabimochi (bracken-starch dumpling), etc], sweetened soup [shiruko (bean paste soup with rice cake), etc], baked confectionarys (pie, biscuit, cookie, cake, hotcake, pudding, etc.), steamed cakes (steamed sponge cake, etc.), candies (starch jelly, konpeito (confetti), caramel, gummy etc.), gum, chocolate, fried cakes [karinto (fried stick covered with sugar syrup), doughnut, etc.], cold confectionarys (ice cream, jelly, etc.), confectionary preserved in sugar/syrup (fruit preserved in syrup etc.), syrup, jam, sweetened condensed milk (condensed milk), cream, yogurt, beverages (juice, carbonated beverage, cooling beverage, etc).

EXAMPLES

Hereafter, the present invention will be explained in more detail by examples. In the examples, evaluation was performed in accordance with the method described below.

That is, organoleptic evaluation by a panel consisting of 12 panelists was performed on various sweetener solutions and such solutions containing the sweetness improving agent of the present invention as well as various foods and such foods containing the sweetness improving agent of the present invention.

The results of evaluation were rated by the following criteria. That is, regarding the intensity of sweetness, symbol +++ indicates 2 folds or more in sugar content (hereafter the same), ++ indicates 1.5 folds or more, + indicates less than 1.5 folds to 1.2 folds or more, ± indicates less than 1.2 folds to 0.8 fold or more, and indicates 0.8 fold or less; regarding sharpness of sweetness, symbol +++ indicates ½ fold or less in lasting time of sweetness (hereafter the same), ++ indicates more than ½ fold and no more than $1/1.5$ fold, + indicates above $1/1.5$ fold and no more than $1/1.2$ fold, ± indicates above $1/1.2$ fold and no more than $1/0.8$ fold, and − indicates $1/0.8$ fold or more; and regarding general evaluation including preferences such as intensity of sweetness and sharpness of sweetness, symbol +++ indicates extremely good, ++ indicates good, + indicates fairly good, ± indicates no change, and − indicates poor.

Example 1

A 10% aqueous solution of fine quality white sugar (manufactured by Mitsui Seito) and a solution of the same composition as this solution except that 0.01 wt % of a yeast extract (Aromild, manufactured by Kohjin, Co., Ltd., containing 10.9% of sodium 5'-inosinate, 10.9% of sodium 5'-guanylate, 10.5% of sodium 5'-uridylate, 8.8% of sodium 5'-cytidylate, and 5.0% of sodium glutamate) based on the fine quality white sugar was added thereto and dissolved were prepared, which solutions were then evaluated on the intensity of sweetness, sharpness of sweetness, etc. Table 1 shows the results of evaluation.

As a result, the solution containing the yeast extract was observed to be significantly excellent in intensity and sharpness of sweetness, respectively, and have an effect of improving sweetness properties.

TABLE 1

|  | Organoleptic Evaluation (Number of panelist) | | | | |
| --- | --- | --- | --- | --- | --- |
|  | +++ | ++ | + | ± | − |
| Intensity of sweetness | 9 | 2 | 1 | 0 | 0 |
| Sharpness of sweetness | 6 | 3 | 1 | 1 | 1 |
| General evaluation | 9 | 1 | 1 | 1 | 0 |

Example 2

A solution of BRIX 70% millet jelly (manufactured by Sudo Jam) and a solution having the same composition as the solution except that 0.01 wt % based on the millet jelly of the yeast extract described in Example 1 was added thereto and dissolved were prepared, which solutions were then evaluated on the intensity of sweetness, sharpness of sweetness, etc. Table 2 shows the results of evaluation.

As a result, the solution containing the yeast extract was observed to be significantly excellent in intensity and sharpness of sweetness, respectively, and have an effect of improving sweetness properties.

TABLE 2

|  | Organoleptic Evaluation (Number of panelist) | | | | |
| --- | --- | --- | --- | --- | --- |
|  | +++ | ++ | + | ± | − |
| Intensity of sweetness | 11 | 1 | 0 | 0 | 0 |
| Sharpness of sweetness | 7 | 2 | 1 | 1 | 1 |
| General evaluation | 8 | 2 | 0 | 2 | 0 |

Example 3

An aqueous solution of 3.0% aspartame (Palsweet, manufactured by Ajinomoto Co., Inc.) and a solution having the same composition as the solution except that 0.01 wt % based on the aspartame of the yeast extract described in Example 1 was added thereto and dissolved were prepared, which solutions were then evaluated on the intensity of sweetness, sharpness of sweetness, etc. Table 3 shows the results of evaluation.

As a result, the solution containing the yeast extract was observed to be significantly excellent in intensity and sharpness of sweetness, respectively, and have an effect of improving sweetness properties.

TABLE 3

|  | Organoleptic Evaluation (Number of panelist) | | | | |
| --- | --- | --- | --- | --- | --- |
|  | +++ | ++ | + | ± | − |
| Intensity of sweetness | 6 | 4 | 1 | 1 | 0 |
| Sharpness of sweetness | 5 | 4 | 1 | 2 | 0 |
| General evaluation | 5 | 5 | 0 | 2 | 0 |

Example 4

An aqueous solution of 0.2% stevia (Marumilon 50, manufactured by Maruzen Pharmaceutical) and a solution having the same composition as the solution except that 0.01 wt % based on the stevia of the yeast extract described in Example 1 was added thereto and dissolved were prepared, which solutions were then evaluated on the intensity of sweetness, sharpness of sweetness, etc. Table 4 shows the results of evaluation.

As a result, the solution containing the yeast extract was observed to be significantly excellent in intensity and sharpness of sweetness, respectively, and have an effect of improving sweetness properties.

TABLE 4

| | Organoleptic Evaluation (Number of panelist) | | | | |
|---|---|---|---|---|---|
| | +++ | ++ | + | ± | − |
| Intensity of sweetness | 6 | 2 | 3 | 1 | 0 |
| Sharpness of sweetness | 6 | 3 | 2 | 1 | 0 |
| General evaluation | 6 | 3 | 1 | 2 | 0 |

Example 5

An aqueous solution of 10% erythritol (manufactured by Mitsubishi Chemical Corp.) and a solution having the same composition as the solution except that 0.01 wt % based on the erythritol of the yeast extract described in Example 1 was added thereto and dissolved were prepared, which solutions were then evaluated on the intensity of sweetness, sharpness of sweetness, etc. Table 5 shows the results of evaluation.

As a result, the solution containing the yeast extract was observed to be significantly excellent in intensity and sharpness of sweetness, respectively, and have an effect of improving sweetness properties.

TABLE 5

| | Organoleptic Evaluation (Number of panelist) | | | | |
|---|---|---|---|---|---|
| | +++ | ++ | + | ± | − |
| Intensity of sweetness | 4 | 4 | 3 | 0 | 1 |
| Sharpness of sweetness | 5 | 3 | 3 | 1 | 0 |
| General evaluation | 5 | 4 | 2 | 1 | 0 |

Example 6

An aqueous solution of 10% xylitol (Xylit, manufactured by Towa Chemical Industry) and a solution having the same composition as the solution except that 0.01 wt % based on the xylitol of the yeast extract described in Example 1 was added thereto and dissolved were prepared, which solutions were then evaluated on the intensity of sweetness, sharpness of sweetness, etc. Table 6 shows the results of evaluation.

As a result, the solution containing the yeast extract was observed to be significantly excellent in intensity and sharpness of sweetness, respectively, and have an effect of improving sweetness properties.

TABLE 6

| | Organoleptic Evaluation (Number of panelist) | | | | |
|---|---|---|---|---|---|
| | +++ | ++ | + | ± | − |
| Intensity of sweetness | 3 | 4 | 4 | 0 | 1 |
| Sharpness of sweetness | 3 | 3 | 5 | 1 | 0 |
| General evaluation | 4 | 3 | 3 | 1 | 1 |

Example 7

An aqueous solution of 0.1% glycyrrhizin (Glycymine, manufactured by Maruzen Pharmaceutical) and a solution having the same composition as the solution except that 0.01 wt % based on the glycyrrhizin of the yeast extract described in Example 1 was added thereto and dissolved were prepared, which solutions were then evaluated on the intensity of sweetness, sharpness of sweetness, etc. Table 7 shows the results of evaluation.

As a result, the solution containing the yeast extract was observed to be significantly excellent in intensity and sharpness of sweetness, respectively, and have an effect of improving sweetness properties.

TABLE 7

| | Organoleptic Evaluation (Number of panelist) | | | | |
|---|---|---|---|---|---|
| | +++ | ++ | + | ± | − |
| Intensity of sweetness | 4 | 4 | 3 | 0 | 1 |
| Sharpness of sweetness | 5 | 3 | 3 | 1 | 0 |
| General evaluation | 5 | 3 | 2 | 1 | 1 |

Example 8

An aqueous solution of 10% fine quality white sugar as described in Example 1 and a solution having the same composition as the solution except that 0.005 wt % based on the fine quality white sugar of the yeast extract described in Example 1 was added thereto and dissolved were prepared, which solutions were then evaluated on the intensity of sweetness, sharpness of sweetness, etc. Table 8 shows the results of evaluation.

As a result, the solution containing the yeast extract was observed to be significantly excellent in intensity and sharpness of sweetness, respectively, and have an effect of improving sweetness properties.

TABLE 8

| | Organoleptic Evaluation (Number of panelist) | | | | |
|---|---|---|---|---|---|
| | +++ | ++ | + | ± | − |
| Intensity of sweetness | 8 | 2 | 2 | 0 | 0 |
| Sharpness of sweetness | 7 | 3 | 1 | 1 | 0 |
| General evaluation | 7 | 3 | 1 | 1 | 0 |

Example 9

An aqueous solution of 10% fine quality white sugar as described in Example 1 and a solution having the same composition as the solution except that 0.2 wt % based on the fine quality white sugar of a yeast extract (Gistex Powder AGGL LS, manufactured by Gistbrokardis, containing 0% of sodium 5'-inosinate, 0% of sodium 5'-guanylate, 0% of sodium 5'-uridylate, 0% of sodium 5'-ctidylate, and 4.5% of sodium glutamate) was added thereto and dissolved were prepared, which solutions were then evaluated on the intensity of sweetness, sharpness of sweetness, etc. Table 9 shows the results of evaluation.

As a result, the solution containing the yeast extract was observed to be significantly excellent in intensity and sharpness of sweetness, respectively, and have an effect of improving sweetness properties.

TABLE 9

| | Organoleptic Evaluation (Number of panelist) | | | | |
|---|---|---|---|---|---|
| | +++ | ++ | + | ± | − |
| Intensity of sweetness | 4 | 2 | 3 | 3 | 0 |
| Sharpness of sweetness | 3 | 4 | 4 | 0 | 1 |
| General evaluation | 4 | 4 | 1 | 3 | 0 |

Example 10

A solution of the millet jelly described in Example 2 and a solution having the same composition as the solution except that 0.05 wt % based on the millet jelly of the yeast extract described in Example 9 was added thereto and dissolved were prepared, which solutions were then evaluated on the intensity of sweetness, sharpness of sweetness, etc. Table 10 shows the results of evaluation.

As a result, the solution containing the yeast extract was observed to be significantly excellent in intensity and sharpness of sweetness, respectively, and have an effect of improving sweetness properties.

TABLE 10

| | Organoleptic Evaluation (Number of panelist) | | | | |
|---|---|---|---|---|---|
| | +++ | ++ | + | ± | − |
| Intensity of sweetness | 3 | 5 | 2 | 2 | 0 |
| Sharpness of sweetness | 3 | 5 | 2 | 1 | 1 |
| General evaluation | 4 | 3 | 3 | 1 | 1 |

Example 11

An aqueous solution of 3.0% aspartame as described in Example 3 and a solution having the same composition as the solution except that 0.005 wt % based on the aspartame of a yeast extract (the yeast extract prepared according to the method described below, containing 11.1% of sodium 5'-adenylate, 10.8% of sodium 5'-guanylate, 9.0% of sodium 5'-uridylate, 8.7% of sodium 5'-citidylate, and 5.3% of sodium glutamate) were prepared, which solutions were then evaluated on the intensity of sweetness, sharpness of sweetness, etc. Table 11 shows the results of evaluation. As a result, the solution containing the yeast extract was observed to be significantly excellent in intensity and sharpness of sweetness, respectively, and have an effect of improving sweetness properties.

Preparation Method for a Yeast Extract

In a 30 liter-jar fermenter was charged with a 15 liters of the medium described below, which was inoculated with a 1 liter of a pre-incubated liquid medium of Candida utilis and incubated at 30° C. for 24 hours with aeration to obtain yeast cells. The medium used was an aqueous solution containing 5 wt % of glucose, 0.2 wt % of ammonium phosphate, 0.2 wt % of ammonium sulfate, 0.1 wt % of magnesium sulfate, 0.17 wt % of potassium chloride, 5 ppm of ferric sulfate, 9 ppm of zinc sulfate, and 4 ppm of manganese chloride, adjusted with ammonia to pH 4.5.

After completion of the incubation, yeast cells were collected by a Sharples (trade name) centrifuge to obtain wet cells. They were resuspended in water and centrifuged, which procedure was repeated twice. This process gave 350 g on dry basis of cells were obtained. Then, water was added to the yeast cells thus obtained to make the total volume 1,500 ml and subsequently heated in a hot water bath at 90° C. for 30 minutes. Thereafter, the mixture was immediately cooled in tap water to decrease the liquid temperature to 40° C. Then, 1.5 g of Protin PC-10 (a protease preparation manufactured by Daiwa Kasei Co., Ltd.) was dissolved in a small amount of water and the resultant solution was added to the mixture, followed by stirring at 40° C. for 10 hours to allow a reaction to proceed.

Next, the mixture was heated at a liquid temperature of 90° C. for 30 minutes and subsequently cooled to 65° C. To this was added a solution of 0.2 g of Ribonuclease P (a 5'-phosphodiesterase preparation, manufactured by Amano Pharmaceutical Co., Ltd.) dissolved in a small amount of water, and the mixture was stirred at this temperature for 3 hours for reaction. Thereafter, insoluble solids were removed by centrifugation to obtain an extract. The extract was heated at 95° C. for 30 minutes and after standing to cool, the extract was converted to powder using a spray drier to obtain 90 g of a yeast extract, which was used in Example 11.

TABLE 11

| | Organoleptic Evaluation (Number of panelist) | | | | |
|---|---|---|---|---|---|
| | +++ | ++ | + | ± | − |
| Intensity of sweetness | 6 | 3 | 1 | 2 | 0 |
| Sharpness of sweetness | 6 | 4 | 1 | 0 | 1 |
| General evaluation | 5 | 5 | 1 | 1 | 0 |

Example 12

An aqueous solution of 0.2% stevia as described in Example 4 and a solution having the same composition as the solution except that 0.002 wt % based on the stevia of the yeast extract described in Example 1 was added thereto and dissolved were prepared, which solutions were then evaluated on the intensity of sweetness, sharpness of sweetness, etc. Table 12 shows the results of evaluation.

As a result, the solution containing the yeast extract was observed to be significantly excellent in intensity and sharpness of sweetness, respectively, and have an effect of improving sweetness properties.

TABLE 12

| | Organoleptic Evaluation (Number of panelist) | | | | |
|---|---|---|---|---|---|
| | +++ | ++ | + | ± | − |
| Intensity of sweetness | 4 | 2 | 4 | 1 | 1 |
| Sharpness of sweetness | 5 | 3 | 3 | 1 | 0 |
| General evaluation | 4 | 3 | 2 | 2 | 1 |

Example 13

An aqueous solution of 0.2% stevia as described in Example 4 and a solution having the same composition as the solution except that 0.005 wt % based on the stevia of the yeast extract described in Example 11 was added thereto and dissolved were prepared, which solutions were then evaluated on the intensity of sweetness, sharpness of sweetness, etc. Table 13 shows the results of evaluation.

As a result, the solution containing the yeast extract was observed to be significantly excellent in intensity and sharpness of sweetness, respectively, and have an effect of improving sweetness properties.

TABLE 13

|  | Organoleptic Evaluation (Number of panelist) | | | | |
| --- | --- | --- | --- | --- | --- |
|  | +++ | ++ | + | ± | − |
| Intensity of sweetness | 5 | 2 | 3 | 2 | 0 |
| Sharpness of sweetness | 3 | 5 | 3 | 1 | 0 |
| General evaluation | 4 | 3 | 2 | 3 | 0 |

Example 14

An aqueous solution of 10% erythritol as described in Example 5 and a solution having the same composition as the solution except that 0.01 wt % based on the erythritol of a yeast extract (Aromild G, manufactured by Kohjin, Co., Ltd., containing 5.3% of sodium 5'-inosinate, 5.9% of sodium 5'-guanylate, 5.2% of sodium 5'-uridylate, 4.4% of sodium 5'-cytidylate, and 1.3% of sodium 5'-glutate) was added thereto and dissolved were prepared, which solutions were then evaluated on the intensity of sweetness, sharpness of sweetness, etc. Table 14 shows the results of evaluation.

As a result, the solution containing the yeast extract was observed to be significantly excellent in intensity and sharpness of sweetness, respectively, and have an effect of improving sweetness properties.

TABLE 14

|  | Organoleptic Evaluation (Number of panelist) | | | | |
| --- | --- | --- | --- | --- | --- |
|  | +++ | ++ | + | ± | − |
| Intensity of sweetness | 7 | 4 | 1 | 0 | 0 |
| Sharpness of sweetness | 7 | 3 | 1 | 1 | 0 |
| General evaluation | 6 | 4 | 2 | 0 | 0 |

Example 15

An aqueous solution of 10% xylitol as described in Example 6 and a solution having the same composition as the solution except that 0.02 wt % based on the xylitol of a yeast extract (Yeast Extract H, manufactured by Kyowa Hakko Industry, containing 5.4% of sodium 5'-inosinate, 5.1% of sodium 5'-guanylate, 4.0% of sodium 5'-uridylate, 4.2% of sodium 5'-cytidylate, and 3.1% of sodium glutamate) was added thereto and dissolved were prepared, which solutions were then evaluated on the intensity of sweetness, sharpness of sweetness, etc. Table 15 shows the results of evaluation.

As a result, the solution containing the yeast extract was observed to be significantly excellent in intensity and sharpness of sweetness, respectively, and have an effect of improving sweetness properties.

TABLE 15

|  | Organoleptic Evaluation (Number of panelist) | | | | |
| --- | --- | --- | --- | --- | --- |
|  | +++ | ++ | + | ± | − |
| Intensity of sweetness | 4 | 4 | 4 | 0 | 0 |
| Sharpness of sweetness | 3 | 4 | 3 | 1 | 1 |
| General evaluation | 4 | 2 | 3 | 2 | 1 |

Example 16

An aqueous solution of millet jelly as described in Example 2 and a solution having the same composition as the solution except that 0.02 wt % based on the millet jelly of a yeast extract (Yeast Extract HY Super, manufactured by Dai-Nippon Meiji Seito Pharmaceutical, containing 5.0% of sodium 5'-inosinate, 5.0% of sodium 5'-guanylate, 4.2% of sodium 5'-uridylate, 3.9% of sodium 5'-cytidylate, and 2.8% of sodium glutamate) was added thereto and dissolved were prepared, which solutions were then evaluated on the intensity of sweetness, sharpness of sweetness, etc. Table 16 shows the results of evaluation.

As a result, the solution containing the yeast extract was observed to be significantly excellent in intensity and sharpness of sweetness, respectively, and have an effect of improving sweetness properties.

TABLE 16

|  | Organoleptic Evaluation (Number of panelist) | | | | |
| --- | --- | --- | --- | --- | --- |
|  | +++ | ++ | + | ± | − |
| Intensity of sweetness | 8 | 4 | 0 | 0 | 0 |
| Sharpness of sweetness | 7 | 3 | 2 | 0 | 0 |
| General evaluation | 8 | 2 | 2 | 0 | 0 |

Example 17

A solution of the millet jelly described in Example 2 and a solution having the same composition as the solution except that 0.005 wt % based on the millet jelly of the yeast extract described in Example 15 was added thereto and dissolved were prepared, which solutions were then evaluated on the intensity of sweetness, sharpness of sweetness, etc. Table 17 shows the results of evaluation.

As a result, the solution containing the yeast extract was observed to be significantly excellent in intensity and sharpness of sweetness, respectively, and have an effect of improving sweetness properties.

TABLE 17

|  | Organoleptic Evaluation (Number of panelist) | | | | |
| --- | --- | --- | --- | --- | --- |
|  | +++ | ++ | + | ± | − |
| Intensity of sweetness | 7 | 3 | 0 | 2 | 0 |
| Sharpness of sweetness | 7 | 2 | 1 | 2 | 0 |
| General evaluation | 6 | 4 | 1 | 1 | 0 |

Example 18

Water (350 g) was boiled and 300 g of fine quality whitesugar as described in Example 1 was added thereto and dissolved therein. To the solution was added 150 g of filtered bean jam (manufactured by Hashimoto Food Industry) and boiled down to prepare a bean jam preparation. To a similarly obtained bean jam preparation was added and mixed 0.01 wt % of a yeast extract as described in Example 1 to prepare a bean jam. The bean jam preparations were evaluated on the intensity of sweetness, sharpness of sweetness, etc. Table 18 shows the results of evaluation.

As a result, the bean jam containing the yeast extract was observed to be significantly excellent in intensity and sharpness of sweetness, respectively, and have an effect of improving sweetness properties for bean jam.

TABLE 18

|  | Organoleptic Evaluation (Number of panelist) | | | | |
| --- | --- | --- | --- | --- | --- |
|  | +++ | ++ | + | ± | − |
| Intensity of sweetness | 10 | 2 | 0 | 0 | 0 |
| Sharpness of sweetness | 9 | 3 | 0 | 0 | 0 |
| General evaluation | 10 | 2 | 0 | 0 | 0 |

Example 19

Glutinous rice powder (manufactured by Yamagata Sangyo) (200 g) and 50 g of fine quality white sugar as described in Example 1 were mixed and then 160 g of water was gradually added thereto, followed by well kneading the mixture to prepare a dough. In a steam was spread a cloth, on which the dough torn into small pieces were arranged and steamed. The steamed dough pieces were transferred into a bowl where they were kneaded and put together. The obtained dough was cut into equal pieces and a suitable amount of the bean jam prepared as in Example 1 (containing no yeast extract) was wrapped with each of the obtained pieces to prepare daifukumochi (rice cake with bean jam inside). To a dough prepared in the same manner as above was added 0.005 wt % based on the dough of a yeast extract as described in Example 1 and mixed to prepare a yeast extract-containing dough. Using this dough and a bean jam prepared as in Example 18 (containing a yeast extract), daifukumochi. The both types of daifukumochi cakes were evaluated on the intensity of sweetness, sharpness of sweetness, etc. Table 19 shows the results of evaluation. As a result, the cake containing the yeast extract was observed to be significantly excellent in intensity and sharpness of sweetness, respectively, and have an effect of improving sweetness properties for daifukumochi cake.

TABLE 19

|  | Organoleptic Evaluation (Number of panelist) | | | | |
| --- | --- | --- | --- | --- | --- |
|  | +++ | ++ | + | ± | − |
| Intensity of sweetness | 6 | 4 | 0 | 1 | 1 |
| Sharpness of sweetness | 7 | 3 | 1 | 0 | 1 |
| General evaluation | 7 | 4 | 1 | 0 | 0 |

Example 20

In a bowl were charged cookie mix (manufactured by Nisshin Seifun; raw material for cookie mix: wheat powder, sucrose, vegetable oil and fat, skimmed milk, an emulsifier, baking powder, spice) and softened butter and mixed. After adding an stirred egg, the mixture was kneaded until a smooth dough was obtained. The dough was spread with a rolling pin and punched with a cookie cutter and the formed dough pieces were baked in an oven to prepare cookies. On the other hand, a cookie mix was prepared which has the same composition as the above-described dough except that 0.01 wt % based on the cookie mix of a yeast extract as described in Example 16 was added and mixed. Cookies were prepared from this dough in the same manner as described above. The both types of cookies were evaluated on the intensity of sweetness, sharpness of sweetness, etc. Table 20 shows the results of evaluation.

As a result, the cookie containing the yeast extract was observed to be significantly excellent in intensity and sharpness of sweetness, respectively, and have an effect of improving sweetness properties for cookies.

TABLE 20

|  | Organoleptic Evaluation (Number of panelist) | | | | |
| --- | --- | --- | --- | --- | --- |
|  | +++ | ++ | + | ± | − |
| Intensity of sweetness | 4 | 4 | 2 | 2 | 0 |
| Sharpness of sweetness | 5 | 4 | 1 | 1 | 1 |
| General evaluation | 4 | 5 | 1 | 2 | 0 |

Example 21

In a bowl charged with hot water was added Jelly-no-moto(raw material of jelly) (manufactured by Ina Food Industry Co., Ltd.; raw material: glucose, sucrose, agar, polysaccharide for increasing viscosity, acidulant, vitamin C, flavour, and grape pigment) and well dissolved. The solution was cooled in a refrigerator to solidify it to obtain a jelly. On the other hand, there was provided a raw material of jelly to which was added 0.01 wt % based on the raw material of jelly of a yeast extract as described in Example 15 was added and mixed and a jelly was prepared in the same manner as described above. The both types of jellies were evaluated on the intensity of sweetness, sharpness of sweetness, etc. Table 21 shows the results of evaluation.

As a result, the jelly containing the yeast extract was observed to be significantly excellent in intensity and sharpness of sweetness, respectively, and have an effect of improving sweetness properties for jellies.

TABLE 21

|  | Organoleptic Evaluation (Number of panelist) | | | | |
| --- | --- | --- | --- | --- | --- |
|  | +++ | ++ | + | ± | − |
| Intensity of sweetness | 4 | 2 | 3 | 3 | 0 |
| Sharpness of sweetness | 3 | 5 | 2 | 2 | 0 |
| General evaluation | 3 | 5 | 1 | 1 | 2 |

Example 22

Rind of a mandarine orange was peeled and crushed in a mixer, followed by squeezing to obtain a raw juice, from which a pulp substance was removed and the residue was deaerated. After adjusting sugar concentration with sucrose and acidity with citric acid, an orange essence was added to obtain an orange juice. On the other hand, to a portion of the orange juice was added and mixed 0.01 wt % based on the orange juice of a yeast extract as described in Example 14 to prepare an orange juice. The both types orange juices were evaluated on the intensity of sweetness, sharpness of sweetness, etc. Table 22 shows the results of evaluation.

As a result, the juice containing the yeast extract was observed to be significantly excellent in intensity and sharpness of sweetness, respectively, and have an effect of improving sweetness properties for orange juices.

TABLE 22

| | Organoleptic Evaluation (Number of panelist) | | | | |
|---|---|---|---|---|---|
| | +++ | ++ | + | ± | − |
| Intensity of sweetness | 6 | 4 | 2 | 0 | 0 |
| Sharpness of sweetness | 5 | 3 | 2 | 1 | 1 |
| General evaluation | 4 | 4 | 0 | 3 | 1 |

Example 23

A carbonated beverage (Coca Cola, manufactured by Coca Cola International; raw material: sugars (fructose/glucose liquid sugar, sucrose), caramel pigment, acidulant, flavour, and caffeine) was provided. To a portion of the carbonated beverage was added and mixed 0.002 wt % based on the carbonated beverage of a yeast extract as described in Example 1 to prepare a carbonated beverage. The both types of carbonated beverages were evaluated on the intensity of sweetness, sharpness of sweetness, etc. Table 23 shows the results of evaluation.

As a result, the brverage containing the yeast extract was observed to be significantly excellent in intensity and sharpness of sweetness, respectively, and have an effect of improving sweetness properties for carbonated beverages.

TABLE 23

| | Organoleptic Evaluation (Number of panelist) | | | | |
|---|---|---|---|---|---|
| | +++ | ++ | + | ± | − |
| Intensity of sweetness | 4 | 4 | 3 | 0 | 1 |
| Sharpness of sweetness | 3 | 4 | 4 | 1 | 0 |
| General evaluation | 4 | 3 | 2 | 2 | 1 |

Example 24

A cooling beverage (Lactia Clear Water, manufactured by Coca Cola International Sales; raw material: erythritol, maltitol, sugars (fructose, oligosaccharide), skimmed milk, flavour, milk minerals, acidulant, soybean polysaccharide, sweetener (stevia), and vitamin E) was provided. To a portion of the cooling beverage was added and mixed 0.005 wt % based on the cooling beverage of a yeast extract as described in Example 1 to prepare a cooling beverage. The both types of cooling beverages were evaluated on the intensity of sweetness, sharpness of sweetness, etc. Table 24 shows the results of evaluation.

As a result, the bevarage containing the yeast extract was observed to be significantly excellent in intensity and sharpness of sweetness, respectively, and have an effect of improving sweetness properties for cooling beverages.

TABLE 24

| | Organoleptic Evaluation (Number of panelist) | | | | |
|---|---|---|---|---|---|
| | +++ | ++ | + | ± | − |
| Intensity of sweetness | 5 | 3 | 4 | 0 | 0 |
| Sharpness of sweetness | 3 | 5 | 2 | 2 | 0 |
| General evaluation | 4 | 3 | 2 | 3 | 0 |

Example 25

In a pan was charged strawberry fruits of which calyxes had been removed and sugar (granulated sugar was used) was added (sugar addition was performed dividedly in three times and pectin had been added in the first portion of granulated sugar). The mixture was heated to concentrate and upon completion of the concentration, citric acid was added to prepare a strawberry jam. To a portion of the strawberry jam was added and mixed 0.01 wt % of a yeast extract as described in Example 14 to prepare a strawberry jam. The both types of strawberry jams were evaluated on the intensity of sweetness, sharpness of sweetness, etc. Table 25 shows the results of evaluation.

As a result, the jam containing the yeast extract was observed to be significantly excellent in intensity and sharpness of sweetness, respectively, and have an effect of improving sweetness properties for strawberry jams.

TABLE 25

| | Organoleptic Evaluation (Number of panelist) | | | | |
|---|---|---|---|---|---|
| | +++ | ++ | + | ± | − |
| Intensity of sweetness | 6 | 4 | 2 | 0 | 0 |
| Sharpness of sweetness | 7 | 3 | 1 | 1 | 0 |
| General evaluation | 6 | 3 | 2 | 1 | 0 |

Example 26

Canned orange (Orange with Syrup (Extra Light), manufactured by Sanyodo; raw material: mandarin orange, sugars (erythritol, glucose/fructose liquid sugar), acidulant, and sweetener (stevia, thaumatin)) was provided. New canned orange was prepared by using the same composition as the canned orange except that 0.01 wt % of a yeast extract as described in Example 16 was added and mixed. The both types of canned orange were evaluated on the intensity of sweetness, sharpness of sweetness, etc. Table 26 shows the results of evaluation.

As a result, the canned orange containing the yeast extract was observed to be significantly excellent in intensity and sharpness of sweetness, respectively, and have an effect of improving sweetness properties for canned orange.

TABLE 26

| | Organoleptic Evaluation (Number of panelist) | | | | |
|---|---|---|---|---|---|
| | +++ | ++ | + | ± | − |
| Intensity of sweetness | 4 | 5 | 3 | 0 | 0 |
| Sharpness of sweetness | 4 | 4 | 2 | 2 | 0 |
| General evaluation | 4 | 3 | 3 | 2 | 0 |

Example 27

In a pan were charged 100 g of sucrose, 100 g of millet jelly, 30 g of condensed milk, and 12 g of wheat powder. The mixture was heated to 80° C. and stirred for mixing. When it became creamy, the mixture was boiled down until the temperature reached 120° C. Then, 4 g of butter was added thereto and mixed well. After cooling down to 40 to 50° C., the mixture was formed temporarily in the form of a roll and then molded to prepare milk candy. Using sucrose and millet jelly containing as mixed therein 0.005 wt % based on the total amount of the raw materials of a yeast extract as described in Example 1, milk candy was prepared in the same manner as described above. The both types of candies were evaluated on the intensity of sweetness, sharpness of sweetness, etc. Table 27 shows the results of evaluation.

As a result, the candy containing the yeast extract was observed to be significantly excellent in intensity and sharpness of sweetness, respectively, and have an effect of improving sweetness properties for milk candies.

TABLE 27

| | Organoleptic Evaluation (Number of panelist) | | | | |
| --- | --- | --- | --- | --- | --- |
| | +++ | ++ | + | ± | − |
| Intensity of sweetness | 8 | 2 | 0 | 2 | 0 |
| Sharpness of sweetness | 7 | 3 | 1 | 1 | 0 |
| General evaluation | 7 | 1 | 2 | 1 | 1 |

Effect of the Invention

According to the present invention, there can be provided a sweetness improving agent which improves sweetness properties, particularly aftertaste properties, i.e., which is excellent in increasing sweetness or improves sharpness of sweetness.

What is claimed is:

1. A method of improving an intensity and sharpness of sweetness properties of a sweetener comprising adding to the sweetener a sweetness improving agent comprising as an effective ingredient a yeast extract containing sodium 5'-dnosinate and/or sodium 5'-adenylate; and sodium 5'-guanylate; sodium 5'-uridylate, and sodium 5'cytidylate, each in mount of 3.9% to 15% based on the weight of the yeast extract, and 1 to 20% of sodium glutamate based on the weight of the yeast extract.

2. The method of claim 1, wherein the sweetness improving agent is added to the sweetener in an amount of 0.0001 to 10 wt % based on the sweetener.

* * * * *

UNITED STATES PATENT AND TRADEMARK OFFICE
CERTIFICATE OF CORRECTION

PATENT NO. : 6,855,360 B2
DATED : February 15, 2005
INVENTOR(S) : Saito et al.

It is certified that error appears in the above-identified patent and that said Letters Patent is hereby corrected as shown below:

<u>Column 16,</u>
Line 17, please delete "5'-dnosinate" and replace with -- 5'-inosinate --

Signed and Sealed this

Seventeenth Day of May, 2005

JON W. DUDAS
*Director of the United States Patent and Trademark Office*